Patented June 24, 1941

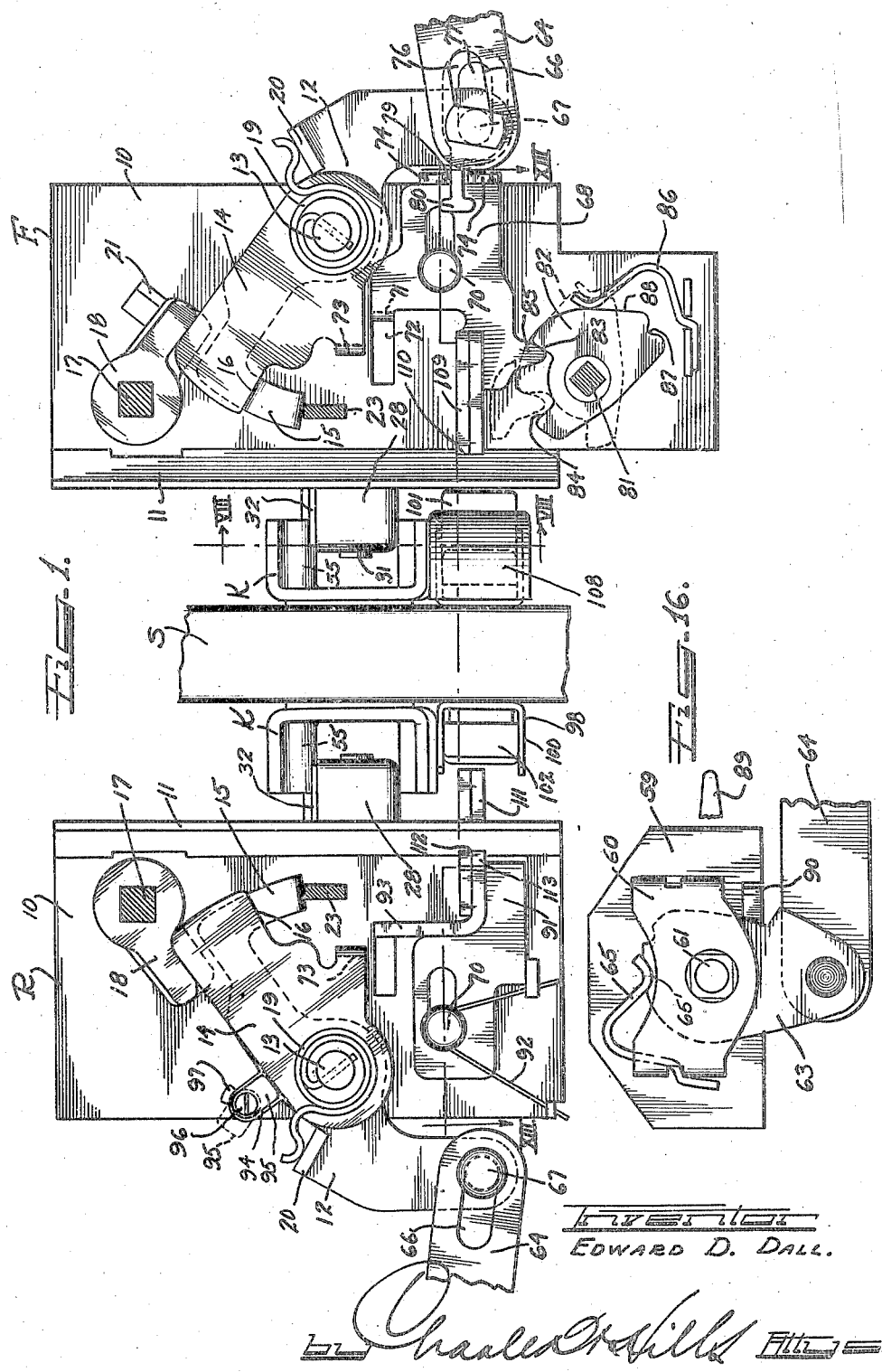

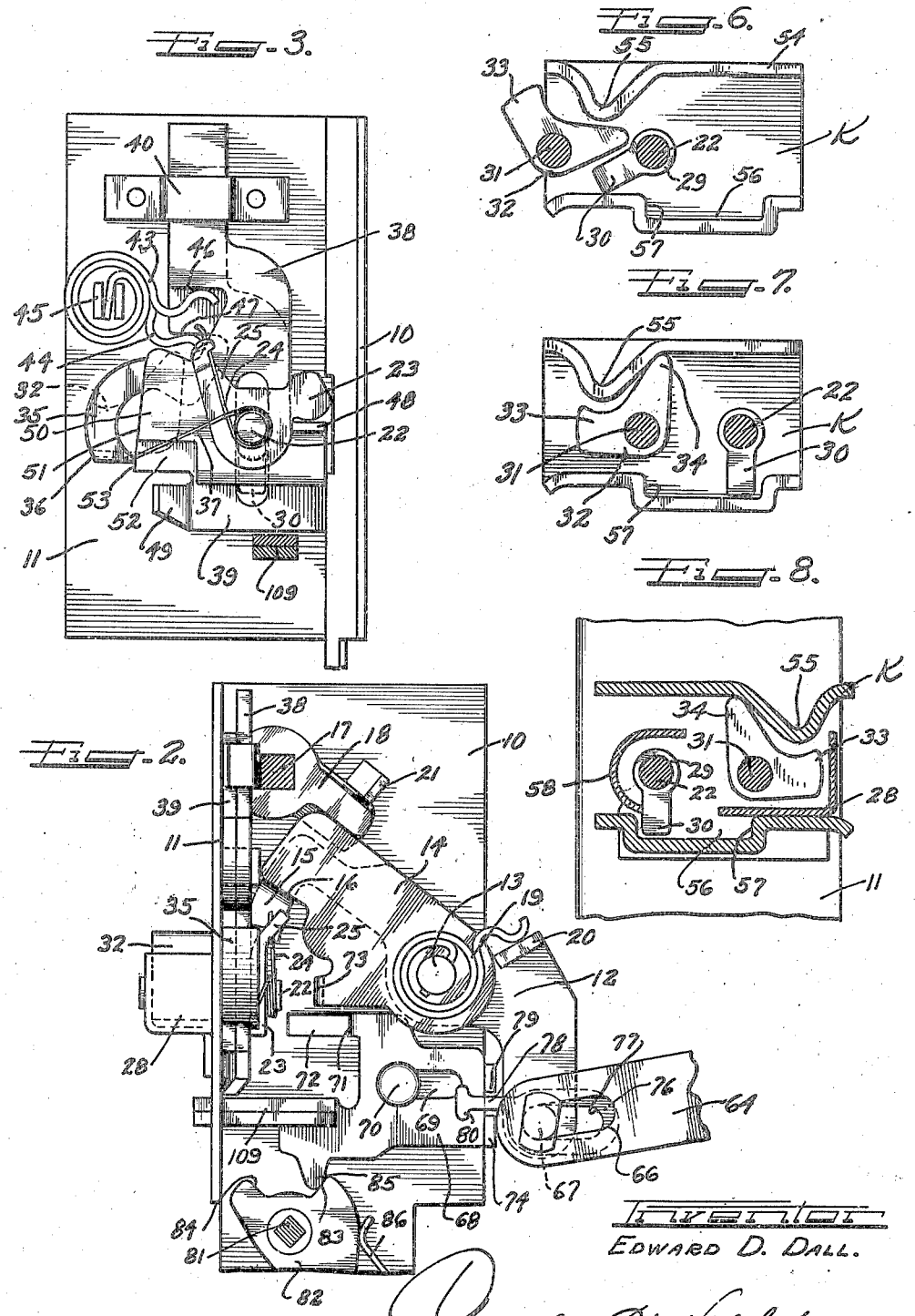

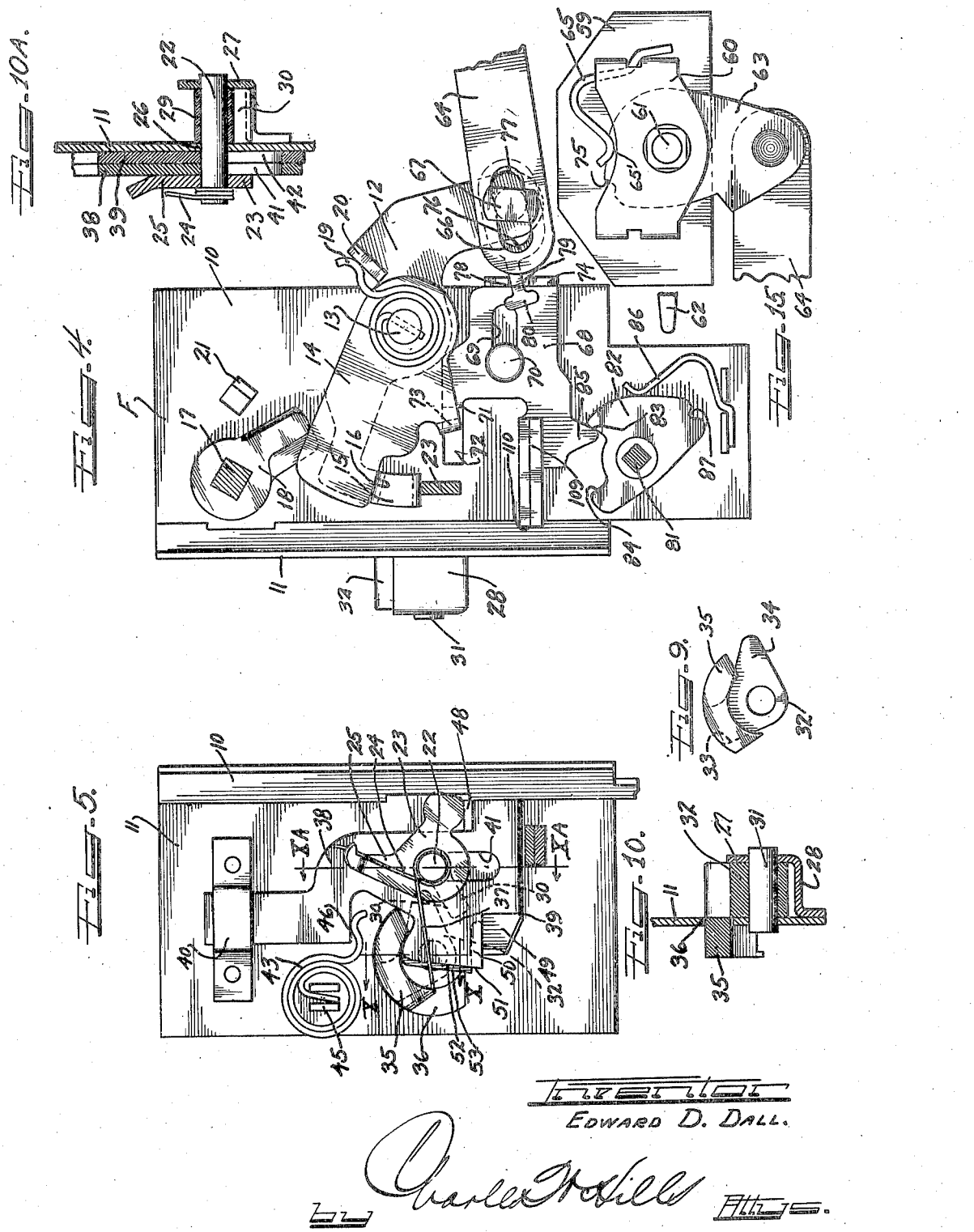

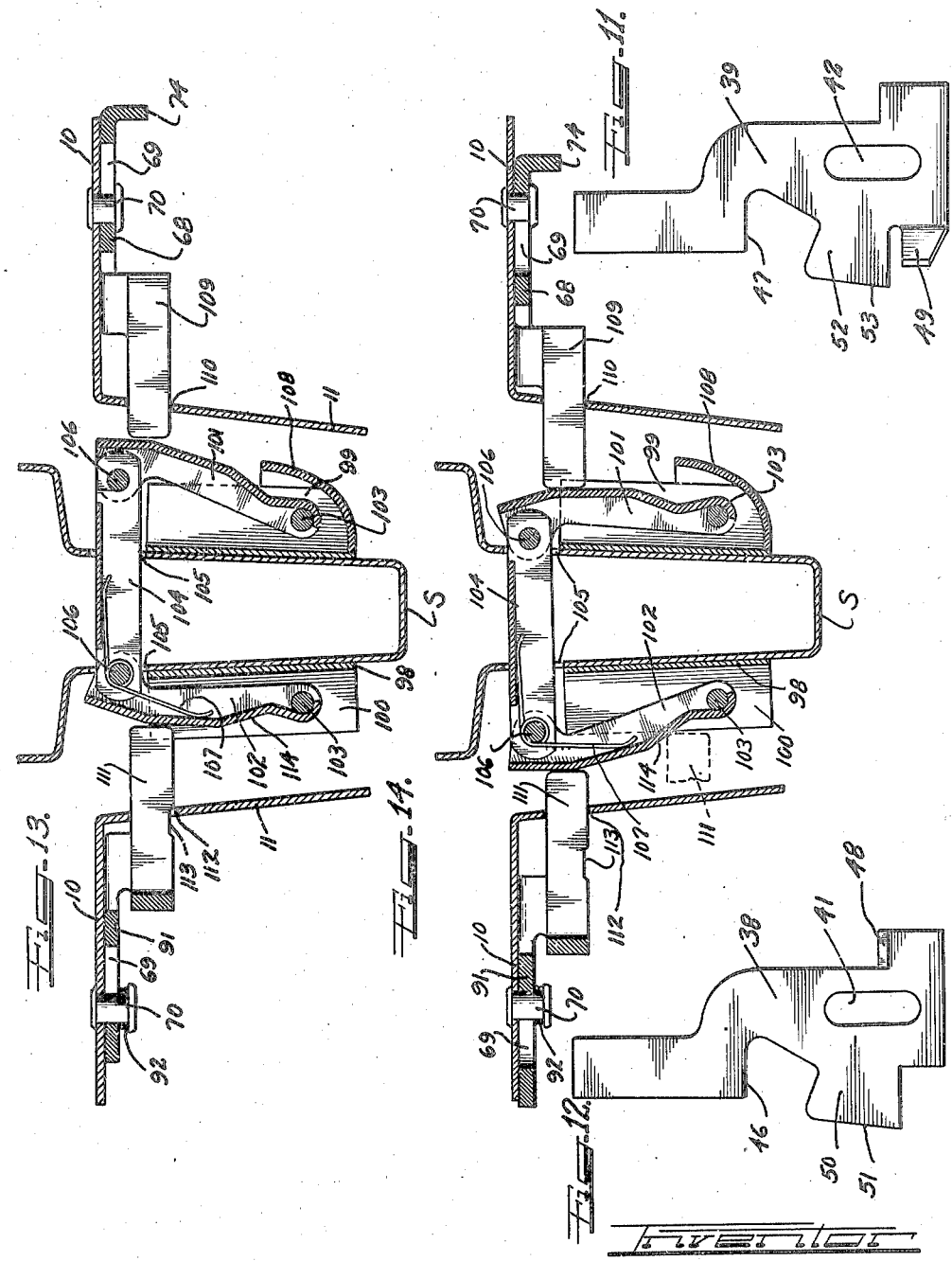

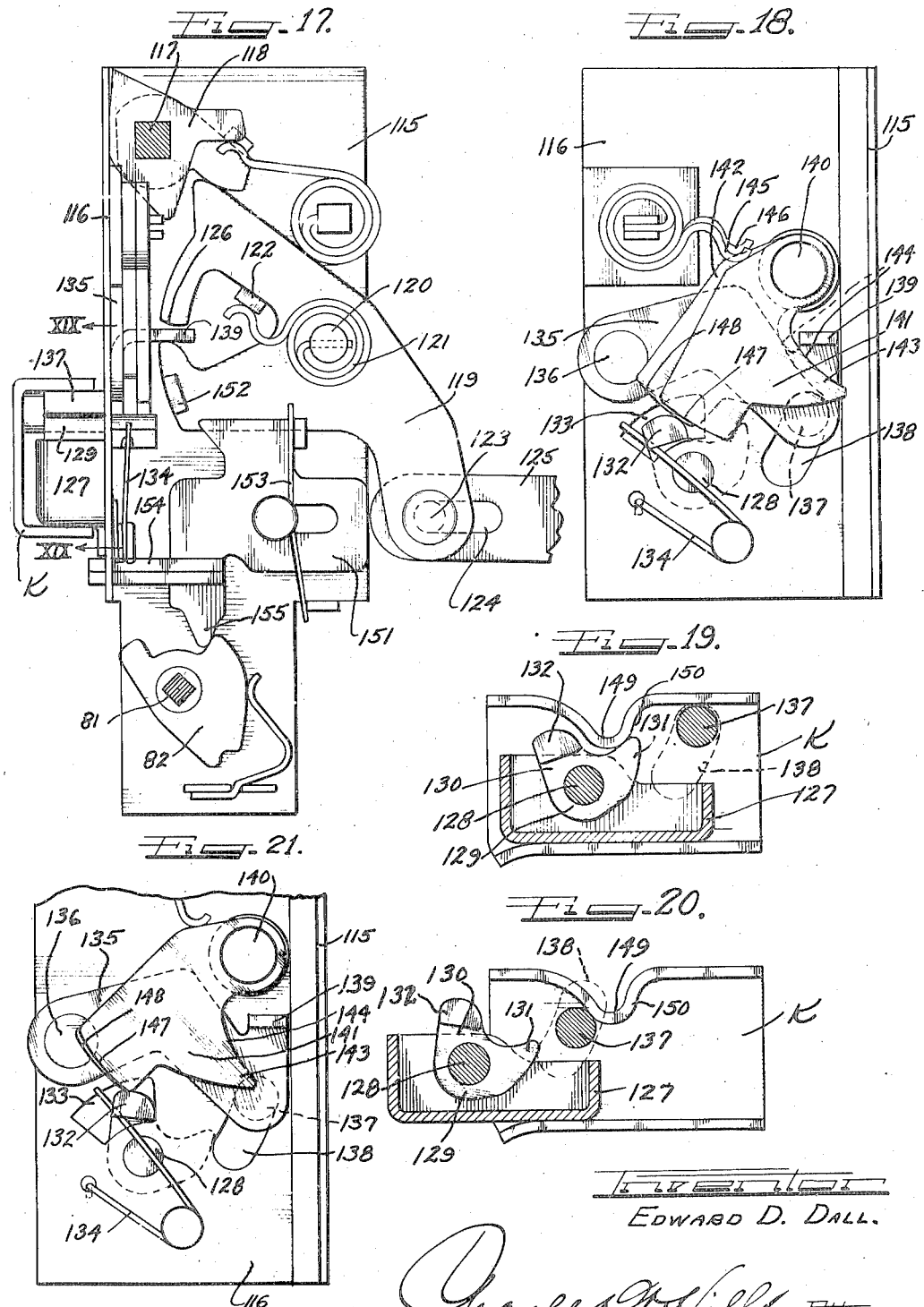

2,246,782

UNITED STATES PATENT OFFICE 2,246,782

AUTOMOBILE DOOR LOCKING STRUCTURE

Edward D. Dall, Detroit, Mich., assignor to Walter F. Wright, Cleveland Heights, Ohio Application July 3, 1939, Serial No. 282,618

6 Claims. (Cl. 292—45)

This invention relates to locking structure for doors of vehicles such as automobiles, particularly locking structure embodying rocking latch bolts which by their engagement with keeper elements are rocked into door latching position when the doors are swung to closed position, but which latching bolts may be readily released for door opening movement by manipulation of the door handle.

An important object of the invention is to provide improved means in the form of wedge elements for forcing the latch bolt into latching position for full closure of the door and to hold the door fully closed together with improved means controlled by operation of the door handles for withdrawing the wedge elements from the latch bolt so that the doors may be swung open.

Another important object is to provide improved safety latch means operable to latch the door against accidental swinging open in case the door has been swung only partially to closed position, with the safety latch means further functioning when the door is moved to its closed position for assuring proper setting of the latch bolt for latched operation in case the latch bolt was accidentally displaced, thereby preventing injury to the lock structure.

A further important object is to produce simple locking structure of the type referred to for each door of an automobile and operable for unlatching by either the outside handle or the inside handle of the door, and which lock structures may be controlled for coincidental locking or unlocking by means of interconnecting means on each side of a vehicle and located in the car body between the lock structures, and with the coincidental control effected either by operation of the inside handle of the front door or by key means on the front door operable from the outside thereof.

A further important object is to provide for such operation and cooperation of the lock structures of the doors on each side of a vehicle that, under abnormal settings or manipulations of the lock structures, slamming shut of the doors from the outside thereof will not lock the driver out of the vehicle, and so that, in case the doors are locked by the key from the outside, a person in the vehicle will not be locked in against egress.

My invention also incorporates other features of construction, operation and control, and all the various features are embodied in the structure disclosed on the drawings, on which drawings:

Figure 1 is an outer side view of the lock structures for the front and rear doors on one side of an automobile, and the interconnecting means within the car body between the lock structures, and showing the lock structures in their normal door latching position;

Figure 2 is an outer side view of the lock structure for the front door;

Figure 3 is a view looking at the inside of the flange on the base plate of the lock structure for the front door and showing the latch bolt controlling parts;

Figure 4 is an inner side view of the lock structure of the front door showing the latch operating parts set for unlatching;

Figure 5 is an inner side view of the flange on the lock plate of the front door lock structure with the latch controlling elements set in unlatching position;

Figure 6 is a front elevation of a keeper structure and showing the latch bolt and safety latch on the corresponding door entering the keeper during closing movement of the door;

Figure 7 is a view like Figure 6 but showing the latch bolt and safety latch in the latching positions with the door fully closed;

Figure 8 is a section on line VIII—VIII of Figure 1 showing the latch elements in their positions when the door is fully closed;

Figure 9 is an inner side elevation of the latch bolt structure;

Figure 10 is a section on plane X—X of Figure 5 showing the latch bolt and its support structure;

Figure 10A is a section on plane XA—XA of Figure 5;

Figure 11 is a front view of one of the wedge elements;

Figure 12 is a front elevation of the other wedge element;

Figure 13 is a section on substantially line XIII—XIII of Figure 1 showing the doors unlocked;

Figure 14 is a section view similar to Figure 13 but showing the two doors locked;

Figure 15 shows the mechanism on the front door operable by the inside handle for controlling the operation of the front door lock structure;

Figure 16 shows the mechanism on the rear door operable by the inside handle for controlling the rear door locking structure;

Figure 17 is an inner side view of a modified locking structure for the front doors;

Figure 18 is an inner side view showing the latch controlling structure on the flange on the base plate of the lock structure;

Figure 19 is a section on line XIX—XIX of Figure 17 showing the latch bolt and safety latch position within the keeper when the door is closed; and Figure 20 is a view similar to Figure 19 showing the safety latch and latch bolt entering the keeper; and Figure 21 is a view like Figure 18 showing the position of the wedge members for holding the latch bolt in set or cocked position.

Referring to Figure 1, F indicates the latch structure on the right front door of an automobile and R indicates the latch structure on the right rear door, the front door being hinged to the car body along its forward edge and the rear door being hinged along its rear edge, with the usual post or stile S on the car body between the free edges of the doors. The latch structure for the front door comprises a base plate 10 having the flange 11 at its outer edge. On the base plate 10 is a lever 12 fulcrumed intermediate its ends on a post 13 secured to the base plate, and in front of this lever and also fulcrumed on the post 13 is the lever 14. The lever 12 has the downwardly directed inner end 15 which is deflected to provide a shoulder 16 against which the lever 14 may engage. A spindle 17 extends through the base plate 10 and at its outer end has secured thereto the door outside handle (not shown). The spindle carries the roll back 18 engageable with the end of the lever 14 when the handle is swung in clockwise direction. A spring 19 which may be anchored on the post 13 engages an abutment 20 on the lever 12 and tends to swing this lever in clockwise direction, the spring resisting counter-clockwise swing of the lever 12 and tending to hold the lever with its shoulder 16 against the lever 14 for swing of the lever 14 to hold the roll back 18 in its normal position against a stop 21 and with the outside handle in its normal position.

Referring to Figures 2, 3 and 5, a shaft 22 has secured to its inner end a lever 23 whose end is in the path of the end 15 of the lever 12 on the base plate 10 so that when the lever 12 is turned in anti-clockwise direction the lever 23 will be swung downwardly. A spring coiled around the shaft 22 has one end 24 engaging the arm 25 of the lever 23 and tends to hold the lever in its upper position shown on Figures 2 and 3. When the lever 12 is swung down, as by means of the roll back 18, the lever 23 will assume the position shown on Figures 4 and 5.

The shaft 22 to the inner end of which the lever 23 is secured extends through a bearing opening 26 in the flange 11 and through the outer wall 27 of a transversely angle shaped fitting 28 secured against the outer face of the flange 11 as best shown on Figures 10 and 10A, the flange 11 and the wall 27 thus forming bearing supports for the shaft. Secured to the shaft 22 between the flange and the wall 27 is a hub 29 from which extends the safety latch arm or lever 30, and, as will be described more in detail later, this safety latch lever cooperates with the latch keeper structure K when the door is closed, to be rotated for rotation of the shaft 22 and the lever 23.

Inwardly of the shaft 22, a shaft 31 extends through the fitting 28 parallel with the shaft 22 and is secured to the flange 11 and to the outer wall 27 of the fitting which shaft forms a fulcrumed support for the rocking latch member 32 (Figures 6, 7, 8 and 10), the latch member being of angular shape and presenting the outer or setting arm 33 and the inner or latching arm 34. On its inner side the latching member 32 has the arcuate extension 35 which projects therefrom through the arcuate slot 36 in the flange 11. The spring which is coiled around the inner end of the shaft 22 and has the leg 24 for engagement with the arm 25 of the lever 23 has its other leg 37 abutting the lower end of the arcuate abutment 35 and this spring tends to hold the latch member in the position shown on Figures 5 and 6 for engagement of the setting arm 33 of the latch member with the keeper structure K for swing of the latch member into latching position of its arm 34 relative to the keeper when the door is swung to closed position, the latching position being shown by Figures 7 and 8.

Describing now the means for forcing the latching element 32 to its full latching position and holding it there, two wedging members 38 and 39 are provided. These wedge members are in the form of plates with the front member 38 overlying the rear member 39, the plates being adapted for vertical shifting and are guided at their upper ends by a guide bracket 40, the members at their lower ends having respectively the guide slots 41 and 42 receiving the shaft 22 which carries the lever 23, the wedge members being between the lever 23 and the flange 11. Spiral springs 43 and 44 are anchored to the flange 11 by a support 45, the end of spring 43 engaging the shoulder 46 on the wedge member 38 and the end of the spring 44 engaging the shoulder 47 on the wedge member 39, the springs tending to shift the wedge plates upwardly and to resist downward shift thereof. The front wedging plate 38 has the abutment 48 below the end of lever 23 so that when the lever 12, which engages with the upper edge of the lever 23, is swung down, the wedge plate 38 will be shifted downwardly, and such downward swing of the lever may be effected by swing of the safety latch lever which is secured to the shaft on which the lever 23 is secured, or by swinging the lever 12 which engages the upper edge of the lever 23 as has already been explained. When the lever 23 is swung down, as shown by Figures 4 and 5, and the wedge plate 38 is shifted downwardly, the lower edge of the plate will engage with the abutment extension 49 on the rear wedging member 39 so that if this wedging member is not in its lower position it will be moved to such position with the wedging plate 38.

The front wedging plate 38 has the wing 50 whose edge is inclined to provide a wedging surface 51. The wedging plate 39 has a similar wing 52 providing a wedging surface 53, the two wedging surfaces being preferably parallel but the wing 52 and the rear wedge plate being a trifle longer than the wing 50 on the front wedge plate.

Referring now to Figures 6, 7 and 8, the keeper structure K which is secured to the post or style between the two doors, is of U-shape cross section, the upper wall 54 having the downward deflection 55 forming a latch detent for the rocking latch member 32. The lower wall of the keeper is deflected to form a passage or recess 56 for the safety latching lever 30, and a latch shoulder 57 for the lever. As shown by Figure 8, the fitting 28 in which the main latch member and the safety latch member are located has its front end 58 rounded so that this fitting may easily center the keeper when the door is closed, the keeper then forming a support for the fitting 28 for vertical support for the free end of the door.

Figures 1, 2 and 3 show the front door fully closed and latched, the latching arm 34 of the latching bolt 32 being behind the latching detent 55 of the keeper, as shown on Figures 7 and 8. As clearly shown by Figure 3, the wedge plates 38 and 39 have been drawn upwardly by their springs with their wedging wings 50 and 52 engaging with the inner edge of the arcuate abutment 35 on the latch member 32 so that this latch member will be held rigidly in latching position to hold the door closed. When the wedge plates are moved upwardly by their springs, the wedging surface 51 of the front wedging plate 38 will first engage with the arcuate abutment, and if the door is not fully closed, the wedging surface 53 of the rear wedge plate 39 will engage with the abutment and force the latch member 32 around further so that the cooperation of the latch member 34 with the latching detent 55 of the keeper will work the door to its fully closed position, and the wedge members will then hold the latch member in such position for closing of the door and prevention of rattling.

If it is now desired to open the door, the outside handle is swung down for swing of the levers 14 and 12 and downward swing of the lever 23 for shifting the wedge plates downwardly with their wedging wings clear of the abutment 35 of the latch member 32 so that the latch member will be released and the door may be swung open. Upon such release of the latch member from the wedge plates, the spring end 37 will swing the latch member back to its position for the next latching operation. When the outside handle is swung down for release of the wedging plates from the latch member, as shown on Figure 5, the latch wings will be below the path of travel of the latch member abutment 35, and then when the handle is released, and the lever 12 is released from the lever 23, the springs 43 and 44 will shift the wedge plates upwardly for detent engagement of the upper edges of the wedge wings 50 and 52 against the under side of the arcuate detent 35 so that the wedge members will then tend to hold the latch member 32 in the position for another latching operation.

When the outside handle has been swung down for unlatching of the door and the door swung open, the handle may be held down while the door is closed, and then released, or the handle may be released when the door has been swung open and the door then swung to closed position. In either event, when the door is moved to closed position, the setting arm 33 of the latch member will encounter the detent abutment 55 of the keeper and the latch member will be brought back to latching engagement with the keeper and such movement will withdraw the abutment 35 of the latching member from the wedge plate wings and the springs 43 and 44 will then shift the wedging plates upwardly for cooperation of the wedging surfaces with the inner edges of the arcuate abutment 35 to force the latch member 32 around for full closure of the door, as shown by Figure 3.

It might happen that, when the door has been unlatched and swung open as shown by Figure 5, and before the door is again swung shut, the latch bolt 32 may be accidentally swung out of its setting position. This of course would result in release of the wedge members from the latch bolt abutment 35, and shift of the wedge members with their wedge wings back to position behind the edge of the abutment 35. The latching arm 34 of the latch bolt will then extend upwardly as shown on Figure 3 and upon closing of the door this latching arm would strike the keeper and become jammed or distorted or broken. However, the safety latch 30 will take care of a situation of this sort. Referring to Figure 6, when the fitting 28 enters the keeper upon closing movement of the door, the safety latch lever 30 which normally extends downwardly as shown on Figure 3, will encounter the outer end of the lower wall of the keeper and will be swung upwardly for rotation of the shaft 22 and downward swing of the lever 23 for resetting of the wedge plates to their lower position to permit the spring leg 37 to restore the latch member 32 to its set position shown on Figures 5 and 6 before the latch bolt enters the keeper. As the door continues its closing movement, the end of the safety latch lever 30 will reach the depression 56 and the shaft 22 will then be rotated by the force of the spring leg 34, and the safety latch lever 30 will be swung back to its normal position and the lever 23 will be released from the wedge elements. As soon as the safety latch lever 30 swings down into the recess 56, and closing movement of the door is stopped before the latch bolt 32 encounters the latching abutment 55 on the keeper, the door will be in safety lock position, that is, the accidental opening of the door will be prevented by the engagement of the lever 30 with the locking shoulder 57 on the keeper. If the door is now swung to fully closed position, the setting arm 33 of the latch bolt will encounter the latching abutment 55 and the latch bolt will be rotated into latching position with its latching arm 34 against the back side of the latching detent 55, and the released wedging plates will then be shifted upwardly by their springs for wedging engagement with the latch bolt for final rotation of the latch bolt and engagement of its latching arm 34 with the latching detent 55 to force the door to a fully closed position and hold it there against rattling. The lever 30 thus functions as a safety latch for the door and also to control operation for assuring proper setting of the latch bolt for latching operation when the door is slammed shut without turning of the outside handle.

Figure 15 shows the inside handle mechanism for the front door lock. As shown it comprises a supporting plate 59 secured to the front door and a plate 60 secured to and spaced from the plate 59, the base and the plate journalling the shaft 61 for the inside handle 62. Between the plates the shaft has secured thereto a depending lever 63 to which is pivoted the bar 64 which extends to the front door locking structure. A spring 65 normally engages in a slot 65' in the lever and tends to hold the lever in its normal position shown on Figure 15.

The bar 64 has the elongated slot 66 which receives the pin 67 of the depending leg of the lever 12 of the locking mechanism as shown on Figures 1 and 2, the outer end of the slot normally receiving the pin so that when the inside handle 62 is swung downwardly the lever 12 will be rocked for engagement with the lever 23 for unlatching of the front door.

Means are provided for dogging the lever 14 against swing by the roll back 18 so that the door cannot be unlatched by operation of the outside handle. The dogging means shown is in the form of dogging plate 68 shiftable transversely on the base plate 10. A guide slot 69 in the plate receives a guide pin 70 on the base plate and at the upper inner corner of the dogging plate it has a guide tongue 71 extending downwardly into the guide slot 72 in the base plate. The lever 14 has a depending abutment 73 above the path of the plate 68. Normally the dogging plate is in the position shown in Figure 2 with its upper corner displaced from the abutment 73 so that the lever 14 may be swung down by the roll back 18 for unlatching of the door by operation of the outside handle. To effect dogging by operation of the inside handle 62, this handle is swung upwardly (Figure 15) for outward shift of the bar 64 for cooperation of the bar end with the abutment flange 74 on the dogging plate so that this dogging plate will be shifted outwardly into position below the abutment 73 on the lever 14, thus dogging this lever and preventing operation of the outside handle. The inside handle mechanism will be held in this dogging position by engagement of the spring 65 in the notch 75 on lever 63.

A link 76 is interposed between the lever 12 and the bar 64 and has the elongated slot 77 receiving the pin 67. At its outer end the link has the arm 78 which extends through the slot 79 in the abutment flange 74, the arm terminating in a crosshead 80. When the dog plate is shifted outwardly by the bar 64 upon upward swing of the inside handle, the abutment flange 74 will engage the head 80 and draw the link 76 outwardly. When the inside handle is swung back through normal position and then downwardly for unlatching of the door by swing of the lever 12 independently of the lever 14, the pin 67 will engage with the rear end of the link slot 77 and the link will be shifted back for engagement of its head 80 with the flange 74 for sufficient rearward movement of the dogging plate 68 to release the abutment 73 on lever 14, and after unlatching and return of the inside handle to its normal position, and closure of the door, the door may again be opened from the outside by operation of the outside handle.

Means are also provided, operable by a key from the outside of the door, for setting the dogging plate 68 to dog the outside handle against unlatching. Below the dogging plate 68, a spindle 81 extends through the base plate 10 and its outer end may have swivel connection with key operable locking means such as a tumbler lock as clearly disclosed in my copending application, Serial No. 265,623, filed April 3, 1939. The spindle carries an actuator plate 82 having the two abutment shoulders 83 and 84 between which extends a tooth 85 depending from the dogging plate 68. Referring to Figures 1 and 2, when the spindle 81 is turned in counterclockwise direction the shoulder 83 on the plate 82 engages the tooth 85 for shifting the dogging plate 68 into dogging position, the end of a spring 86 then engaging in the notch 87 in the plate 82 to hold this plate in dog setting position. When the key is turned in the opposite direction the shoulder 84 will engage the tooth 85 for restoring the dogging plate 68 to undogging position, the engagement of the spring with the inclined or cam surface 88 on the plate 82 then assisting in restoring the plate to normal position and the dogging plate to its normal undogging position. The front door may thus be locked from the outside by key operation of the dogging plate 68, but anyone inside the car may get out by swinging down the inside handle of the front door for unlatching by swing of the lever 12, and during such operation of the inside handle, the link 76, which was shifted outwardly with the key operated dogging plate will be returned to pull back the dogging plate to undogging position, the engagement of the tooth 85 during such return shift of the dogging plate rotating the plate 82 back to its unlocking position.

The latching mechanism and its operating means for the rear door locking structure may be the same as that for the front door locking structure, and the same reference characters are therefore applied to like parts.

The inside door latching means for the rear door operable by the inside handle 89 is substantially the same as the inside mechanism for the front door and therefore the same reference characters will be applied to the like parts. Where the rear door lock structure is interconnected with the front door locking structure, the plate 59 of the rear door inside handle mechanism is provided with a stop 90 for the lever 63 so that the lever can be swung by the inside handle only in the direction for pull on the bar 64 for swing of the lever 12 for unlatching of the rear door, the slot 66 in the outer end of the bar receiving the pin 67 permitting swing of the lever 12 by operation of the outside handle for unlatching from the outside. The dogging plate 91 for the rear door lock is not controllable by operation of the inside handle mechanism of the rear door but is adapted to be controlled by manipulation of the front door lock structure. A spring 92 tends to hold the dogging plate 91 in its normal undogging position, and when the plate is shifted inwardly the arm 93 thereon will be below the abutment 73 of the lever 14 so as to prevent unlatching of the door by operation of the outside handle.

As shown on Figure 1, the lever 12 for the rear door lock structure has a bracket 94 extending from its upper edge and on this bracket an abutment plate 95 is pivoted as by a screw 96. When the plate 95 extends downwardly as shown on Figure 1 it forms a connecting abutment link between the lever 12 and the lever 14 so that when the inside handle of the rear door is swung down for unlatching swing of the lever 12, the lever 14 will swing therewith. Therefore when the dogging plate 91 is in its inner or dogging position under the abutment 73 on the lever 14 the inside handle cannot be swung down and therefore the rear door will be locked against unlatching by either the inside handle or the outside handle. However, when the link 95 is set to the dotted position shown on Figure 1, away from the lever 14, then when the dogging plate 91 is in dogging position, the inside handle may be swung down for swing of the lever 12 for unlatching of the rear door so that the rear door will be only locked against unlatching by operation of the outside handle. The pivot screw 96 may be tightened to secure the link 95 in its lower position, or against a stop 97 in its upper or release position.

The lock structure interconnecting means are shown on Figures 1, 13 and 14. This mechanism is mounted on the door post or style S below the keeper structure K. It comprises a frame structure 98 receiving the front part of the post and providing ledges 99 and 100 for inwardly extending levers or flapper members 101 and 102 pivoted to the ledges at their outer end by pins 103. A cross bar 104 extends through openings 105 in the post and at its ends is pivoted to the levers 101 and 102 by pins 106, a spring 107 tending to swing the cross bar and the lever toward the front door as shown on Figure 13. An actuate cam plate 108 is secured to the frame 98 in front of the lever 101.

In the front door locking structure, a locking pin 109 is secured to and extends outwardly from the dogging plate 68 through a passage 110 in the flange 11, for engagement with the lever 101 of the interconnecting mechanism in the door post. In the rear door locking structure a locking pin 111 is secured to and extends from the dogging plate 91 through the passageway 112 in the flange 11 for engagement with the lever 102 of the interconnecting mechanism. In the arrangement shown, when the dogging plate 68 of the front door lock structure is shifted outwardly, it will swing the lever 101 and consequently lever 102 will be swung by the cross bar 104 and the locking pin 111 of the rear door lock structure will be shifted inwardly into position to cause dogging of the lever 14. When the locking plate 68 in the front door lock structure is released or withdrawn, the spring 92 in the rear door lock structure will shift the dogging plate 91 out to its normal position for undogging of the lever 14. Figures 1 and 13 show the doors latched in their closed positions but unlocked by the dogging means, while Figure 14 shows the dogging means in dogging position for locking of the doors.

Describing now the various operations, when the doors are latched in closed position but undogged, the outside handle on either door may be swung down for unlatching of that door or either door may be unlatched by downward swing of the inside handle. If the driver desires to lock both front and rear doors from the inside he swings the inside handle of the front door up for shifting out of the dogging plate 68 to dog the roll back of the outside handle of the front door, and to operate the interconnection mechanism in the door post for shifting of the dog plate 91 in the rear door lock structure for dogging of the lever 14. If the abutment link 95 in the rear door lock is in its down position, then the dogged lever 14 will prevent swing of the lever 12 by the rear door inside handle and therefor the rear door will be locked against both ingress and egress. If in certain installations it is desired to lock the rear door only against ingress, then the abutment link 95 is set to its upper or release position so that the lever 12 will be free of the dog lever 14 for swing by operation of the inside handle for unlatching of the door.

When the inside handle at the front door was swung upwardly for shifting of the dogging plate it was then held in such position by the engagement of the spring 65 in the detent notch 75 in the lever 63 of the front door inside handle mechanism. To unlock the doors the driver will swing the inside handle of the front door downwardly to its normal position to release the bar 64 from the dogging plate 68 so that the spring 92 in the rear door lock structure may shift the locking plate 91 outwardly to undogging position and to swing the levers in the door post interconnecting means for inward shift of the locking pin 109 in the front door lock structure and thereby undogging of the dogging plate 68, and both doors will be unlocked.

When both doors are closed and latched, they may be locked by the key means from outside of the front door by turning of the spindle 81 and the actuator plate 82 for outward shift of the front door dogging plate 68 and actuation of the interconnecting means in the door post for shift of the rear door dogging plate 91 into dogging position. After such locking, the spring 86 will engage in the detent notch 87 of the actuator plate 82 to maintain the locking condition. When the key is turned in unlocking direction, the actuator 82 will shift the dogging plate 68 in the front door to undogging position and the spring 92 will shift the dogging plate 91 in the rear lock back to undogging position.

If both doors are locked by operation of the inside handle of the front door by a person remaining in the car, and such a person for some reason or other should be unable to unlock the doors, unlocking can be accomplished from the outside by means of the key, for when the key is turned to rotate the actuator 82 to its unlocking position, the holding or detent force of the spring 65 at the inside handle structure will be overcome and the bar 64 will be shifted back for release of the dogging plate 68 and release of the dogging plate 91 in the rear door by the spring 92. Thus when the door is locked from the inside it can be readily unlocked from the outside. Also, if the door is key locked from the outside, it can be unlocked from the inside for egress by swinging down the front door inside handle, such operation causing movement of the locking plate 68 with the bar 64 to undogging position and withdrawal of the locking pin 109 so that the spring 92 in the rear door may shift the dogging plate 91 to undogging position. Shift of the dogging plate 68 in the front door to undogging position by the inside handle operation will, by engagement of the dogging plate tooth 85 with the abutment 83 of the actuator plate 82, rotate said actuator plate back to normal or unlocking position, the spring 86, after withdrawal of the detent notch 87 therefrom, exerting pressure against the inclined surface 88 of the actuator plate 82 for quick movement of the actuator plate back to unlocking position and quick movement of the dogging plate 68 back to undogging position, this being made possible by the lost motion connection between the head 80 of link 76 and the abutment flange 74 on the dogging plate.

Provision is also made for preventing lockout of the driver following certain abnormal manipulations. Suppose that, with the rear door closed, the driver steps out of the front door with the locking pin 109 accidentally in its outer position either by manipulation of the inside handle or the key means, and the driver slams the door shut. If the cam plate 108 were not provided in front of the post lever 101, the post means would be actuated by projected pin 109 for dogging of the rear door and both doors would be locked, but the driver, if he had his keys, could reopen the doors. However, if he had left the keys in the car he would be locked out. To prevent such lockout the cam plate 108 is provided and with this cam plate, when the front door with the projecting locking pin 109 is swung shut, the pin will engage with the cam plate and will be shifted in to set the dogging plate 68 to undogging position so that the front door can be opened by the outside handle. If the pin 109 had been shifted out by the operation of the key means before swinging shut of the door, then when the door is slammed shut the key means will be restored by the inwardly shifted dogging plate to its unlocking position and then after the door is shut the driver can insert the key and lock the doors.

A condition may arise where the front door is shut and locked either by the inside handle means or by the key operated means, while the rear door is open. Under these conditions swinging shut of the rear door should not result in locking of the rear door, so that the driver will not be locked out in case he does not have his keys with him. To prevent such lockout, the locking pin 111 of the rear door is provided with a notch 113 in its outer side for cooperation with the front edge of the passageway 112 through which the pin extends, the notch being normally in alignment with the passageway as shown on Figure 13. Under the conditions assumed, the door post transmission parts will be as shown by Figure 14. Now when the rear door is swung shut, the projected pin 111, as shown by the dotted lines, will encounter the inclined portion 114 on the post lever 102 and the pin will be moved laterally a distance away from the base wall 10 for engagement at its notch 113 with the front edge of the passageway 112 so that the pin will be held against longitudinal inward shift, and consequently the lever structure in the door post will be swung towards the front door so that the locking pin 109 of the front door locking structure will be shifted in for undogging of the dogging plate 68 so that both doors will be unlocked and the driver cannot be locked out. The ends of the notch 113 are sufficiently bevelled so that the notch will not interfere with the inward shifting of the pin 111 when the doors are to be locked after closure thereof.

Figures 17 to 21 show a modified arrangement for controlling the latching. The lock structure shown is for the front door and has the base 115 and flange 116. The outside handle spindle 117 supports suitable roll back mechanism 118 engageable with a setting lever 119 journalled on a stud 120 extending from the base plate. A spring 121 engages the abutment 122 on the lever and tends to hold it in normal position with its upper end against the roll back. The lever at its lower end has the pin 123 engaging in the slot 124 of the bar 125 extending to the inside handle mechanism (not shown), which handle mechanism may be the same as that shown on Figure 15. At its outer upper end the lever has the slot 126.

Secured against the outer face of the flange 116 is the fitting 127 through which a shaft 128 extends, the shaft being secured to the flange 116 and to the outer wall of the fitting 127. Journalled on this shaft is the latch member or bolt 129 which has the setting arm 130 and the latching arm 131. The setting arm 130 has a lateral extension 132 projecting through the slot 133 in the flange 116. A spring 134 tends to swing the latch bolt into its set or cocked position as shown on Figure 20.

On the inside of the flange 116 near the outer edge thereof a camming lever 135 is fulcrumed on a pin 136, this lever extending inwardly of the base plate 115. At its inner end the lever has secured thereto the safety latch pin or bolt 137 which projects outwardly through the slot 138 in the flange 115 in advance of the latch bolt 129. Above the pin, the lever has the projection or abutment 139.

Above the inner end of the lever 135 a stud 140 on the flange 115 fulcrums the front and rear wedging levers 141 and 142, in the form of plates. Each of the wedge levers has a rearwardly extending wing 143, the upper edges of the wings being inclined to provide cam surfaces 144, the wings extending below the abutment 139 on the lever 135 for cooperation of the abutment with the cam surfaces. Springs 145 and 146 tend to swing the wedge levers inwardly, the swing being limited by the engagement of the ends of the lever wings with the base plate 115. At their outer lower ends, the levers terminate above the extension 132 of the latch bolt 129 and provide the wedging surfaces 147 and 148 for cooperation with the extension. Figures 17 and 18 show the wedge levers in their inner position with their wedging surfaces in engagement with the latch bolt extension to lock the latch bolt in its latching position relative to the keeper K, as also shown on Figure 19. When the levers are swung to their inner position, their cam surfaces 144 will engage with the abutment 139 on lever 135 and this lever will be raised to carry the safety latch bolt 137 to the upper end of the slot 138. The wedging surface 148 on the lever 142 may be a distance in advance of the wedging surface 147 on the lever 141, or the wedging surfaces may have different inclination angles, so that the front lever 141 may first engage its wedging surface with the latch bolt extension 132 for forcing this bolt toward its full latching position, and to be followed by the wedging engagement of the lever 142 with the extension so as to assure full movement of the latching bolt to its latching position and forcing of the door to its completely closed position, the wedge levers then holding the latch bolt in such position.

The keeper structure K has its upper wall deflected downwardly to provide the latching abutment 149 for the latch bolt 129 and the safety latch bolt 137.

As shown on Figure 17, the abutment 139 on the lever 135 extends into the slot 126 in the setting lever 119. Figures 17, 18 and 19 show the door in its latched position. To unlatch the door either the outside handle or the inside handle is swung downwardly for swing of the setting lever 119. Such swing of the lever will, by engagement of its slot 126 with the extension 139 on lever 135, cause downward swing of the lever 135 and movement of the safety latch bolt 137 downwardly below the level of the keeper latching abutment 149. Also upon downward swing of the lever 135 the cooperation of its extension 139 with the cam surfaces 144 of the wedge levers will cause these levers to be swung outwardly to carry the lower ends of their wedging edges above and clear of the latch bolt extension 132 so that the latch bolt will be free to rotate for disengagement of its latching arm 131 from the keeper latching abutment 149, the spring 134 also swinging the latch bolt to its unlatching position. Figure 20 shows the door unlatched and entering the keeper structure for closure and latching thereof. The latch bolt 129 is in its set or cocked position, being held in this position by the spring 134. As shown on Figure 21, when the latch bolt is in this cocked position, its extension 132 will be below the lower outer corners of the wedge levers to hold these levers in their upper positions against the force of their springs 145 and 146. The inner sides of the wedge levers with their cam surfaces 144 will then be displaced downwardly from the extension 139 on the lever 135 so that as the door moves inwardly relative to the keeper, the safety latch pin 137 will be shifted downwardly by its engagement with the keeper detent abutment 149 and the lever 135 will correspondingly swing downwardly, and as soon as the safety latch bolt has passed the keeper abutment the bolt will be carried upwardly by the lever 137 by the force of the spring 121 which swings back the setting lever 119 after this lever has been swung downwardly upon the downward movement of the safety latching bolt. The front surface of the keeper abutment 149 is gradually inclined so that it may readily cam the safety latch bolt downwardly during closure movement of the door, but the rear side 150 of the keeper abutment is less inclined so that when the safety latch bolt is behind the keeper abutment the door will be safety latched against opening from such safety latching position. As the door proceeds with its closing movement after the latching engagement of the safety latching bolt with the keeper, the setting arm 132 of the main latch bolt 129 will engage with the outer face of the keeper abutment 149 and the latch bolt will be cammed to be rocked to swing up its latching arm 131 into position behind the keeper latching abutment, and during such movement the latch bolt extension 132 is withdrawn from below the corners of the wedging levers and these wedging levers are snapped down by their springs with their wedging surfaces in engagement with the latch bolt extension to force the latch bolt around for engagement of its latching arm with the keeper for complete closure of the door. As soon as the wedging levers are released their inner ends will re-engage with the extension 139 of the lever 135 and the safety latch bolt 137 will be held in its upper position by the force of the springs acting against the wedge levers.

When the door is unlatched by operation of either the inside or outside handle, and swung open, the latch bolt 129 will be swung to its set or cocked position and should maintain this position for the next door latching operation. However, some one may swing the latch bolt into its locking position while the door is open and in doing so the wedging levers would be released and would hold the latch bolt in its locking position, and then upon closure of the door the latching arm 131 of the latch bolt would strike the keeper and there might be jamming, distortion, or breakage. Such condition is well taken care of by the safety latch bolt 137. As this safety latch bolt enters the keeper in advance of the main latch bolt, its cooperation with the keeper abutment 149 will cause downward swing of the lever 135 and engagement of the lever extension 139 with the wedge levers to restore these wedge levers to their upper position to release the main latch bolt so that the spring 134 can restore the latch bolt to its set or cocked position before the latch bolt reaches the keeper abutment 149. The safety latch bolt 137 thus performs the double function of safety latching the door, and assuring proper setting of the main latch bolt for the door latching operation.

Referring to Figure 17, the lock structure may be provided with a dogging plate 151 shiftable inwardly by the bar 125 by operation of the inside handle to project its upper end below the abutment 152 of the setting lever 119 so as to dog this lever against swing by the roll back and thereby lock the outside handle against unlatching movement. A spring 153 tends to hold the dogging plate in its outer position. Where the lock structure is to control the locking of remote doors, the dogging plate 151 will be provided with a locking pin 154 for cooperation with transmission mechanism in the door post in a manner as has been described in connection with the structure shown on Figure 1. Key operable means like that shown on Figure 1 may also be provided for cooperating with the tooth 155 on the dogging plate 151 for controlling the shitfing of the plate.

On Figure 1, the lock structures for the front and rear doors at the right side of the car are shown for coincidental locking and control from the front door. The locking installation for the front and rear doors on the left side of the vehicle may be the same as that on the right side, and, if desired, the key operable means may be omitted from the latch structure on the left front door so that the locking assembly on the left side of the automobile may be locked only by operation of the front door inside handle mechanism.

Instead of separately controlling the locking at the opposite sides of the vehicle, lock structure such as F, Figure 1, may be provided only on the right front door and lock structure R, provided on each of the rear doors and on the left front door with the interconnecting means in the two door posts connected by cable or other transmission means so that upon operation of the lock structure in the right front door all the other lock structures will be controlled for coincidental locking or unlocking. Cross connecting means in the door posts can be provided, such as shown in my Patent No. 2,102,997 dated December 21, 1937, may be used.

I have shown practical and efficient embodiment of the various features of my invention but I do not desire to be limited to the exact construction, arrangement and operation shown and described as changes and modifications may be made without departing from the scope of the invention.

I claim as follows:

1. Locking structure for an automobile door comprising a main latch bolt and a safety latch bolt, a common holding means engaging both bolts for holding them in locking position when the door is in closed position, and means operable from either the inside or the outside of the door for releasing said holding means for operation of said bolts for door opening.

2. Lock structure for an automobile door comprising a main latch bolt and a safety latch bolt, holding means for holding both bolts in door latching position when the door is in closed position, and means operable from either side of the door for releasing said holding means from said bolts and for setting said safety latching bolt to unlatching position, and means effective upon release of said holding means for setting said main latch bolt to unlatching position.

3. Locking structure for an automobile door having an outside handle and an inside handle, a latch bolt, releasing means for said latch bolt, a first lever operable by manipulation of said outside handle for actuating said releasing means, a second lever operable by manipulation of the inside handle for actuating said releasing means, locking means for rendering said first lever ineffective to actuate said releasing means, and coupling means for said lever adapted in one position to permit operation of said second lever by said inside handle mechanism to actuate said releasing means when the first lever is locked and in another position to couple said levers together for locking of said second lever by said first lever whereby said latch releasing means will then be locked against actuation by manipulation of either handle.

4. Door locking structure for an automobile door comprising a latch bolt for latching the door in closed position, releasing means for said latch bolt, an inside handle and an outside handle normally independently operable to effect acuation of said releasing means for unlatching of the latch bolt, locking means, and means adapted in one position to render said locking means effective to lock both handles against actuation of the releasing means and in another position to render said locking means effective to lock only one of said handles against actuation of the releasing means.

5. Locking means for an automobile door comprising a lock structure on the door and a keeper structure on the door frame, a main latch bolt on said lock structure normally in cocked position and engageable with the keeper structure to be rocked from cocked position to latching engagement with the keeper structure when the door is swung from open to closed position, setting means for said main latch bolt, a handle for said door for controlling said setting means for re-setting of said main latch bolt to cocked position prior to closure movement of the door in the event that said bolt has accidentally become uncocked while the door is open, and a safety latch bolt on said lock structure cooperable with said keeper structure, said safety latch bolt being adapted to serve the double purpose of safety latching said door in partially closed position and effecting actuation of said setting mechanism for cocking thereby of said main latch bolt prior to its engagement with the striker structure in the event that said main latch bolt has accidentally become uncocked while the door is open and has not been recocked by operation of the handle before closing movement of the door.

6. Locking means for an automobile door comprising a lock structure on the door and a keeper structure on the door frame, a main latch bolt on said lock structure engageable with said keeper structure to be guided thereby from unlatching position to latching position when the door is swung from open to closed position, yielding means tending to move said bolt to unlatching position, holding means adapted at one setting thereof to lock said bolt in unlatching position and in another setting to lock said bolt in latching position, setting means on said lock structure for said holding means, manual control means for said setting means for effecting release of said holding means from said bolt for return of said bolt to unlatching position while said door is in open position in the event that said bolt has become accidentally locked in latching position while the door was open, and safety means on said lock structure engageable with said keeper structure in advance of said bolt when the door is swung to closed position for effecting release of said holding means from said bolt for return of the bolt to unlatching position before engagement thereof with the keeper structure in the event said manual control means has not been operated.

EDWARD D. DALL.